Patented Apr. 23, 1929.

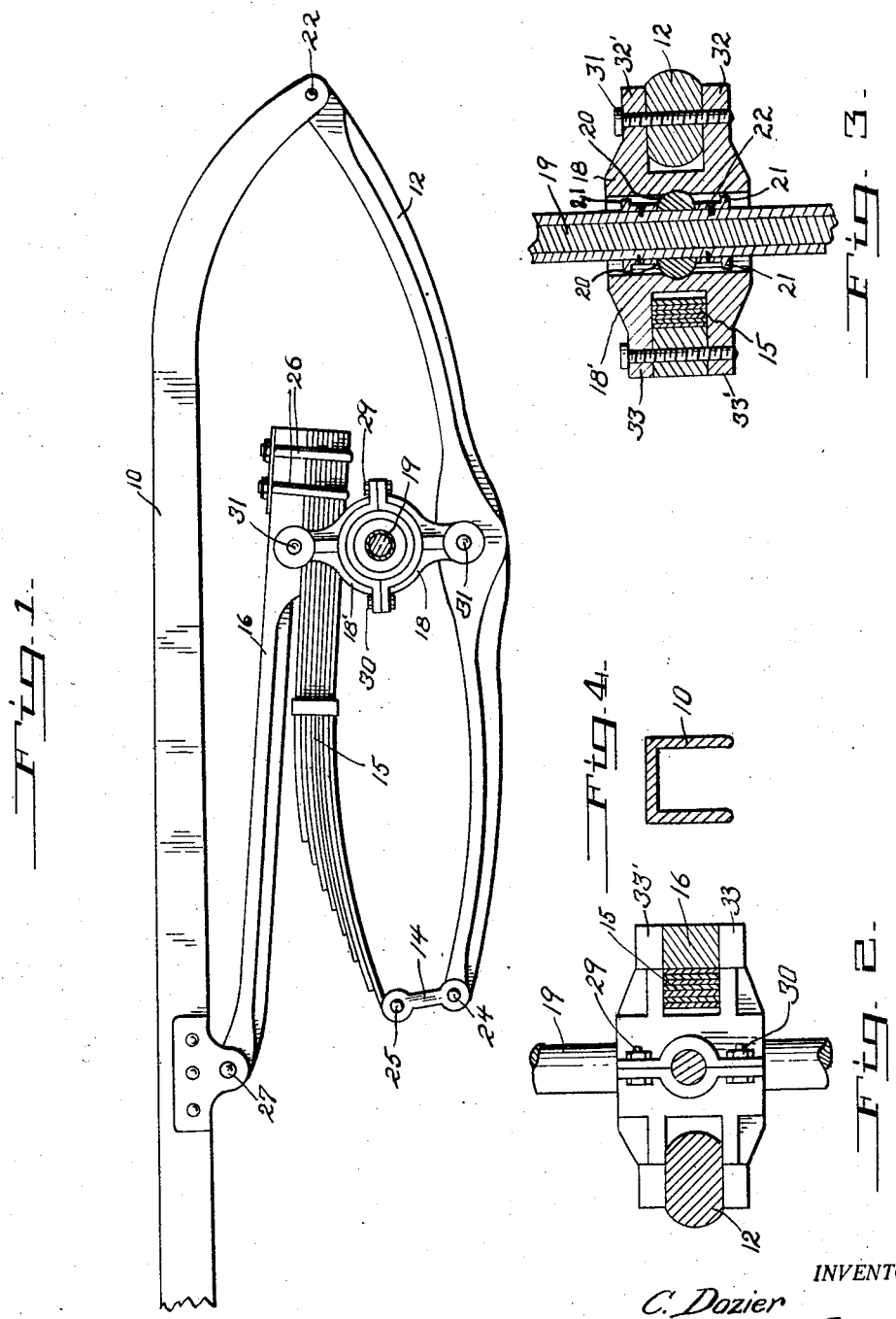

1,710,451

UNITED STATES PATENT OFFICE.

CALVIN DOZIER, OF RICHMOND, KENTUCKY.

SHOCK ABSORBER.

Application filed July 22, 1927. Serial No. 207,750.

This invention relates to a vehicle spring, constituting a shock absorber and is an improvement on the spring shown in the patent granted to me September 18, 1923, Serial No. 1,468,614.

The important object of the invention is to provide a spring of the "seesaw" type with as few parts as possible, but still working on the "seesaw" principle, as disclosed in my patent.

With the above and other objects in view, which will appear as the description proceeds, I will now describe my invention in connection with the accompanying drawings, in which Fig. 1 is an elevation of my improved spring and connections.

Fig. 2 is a sectional view of the spring at right angle to Fig. 1.

Fig. 3 is a sectional view through the axle, and

Fig. 4 is a sectional view of the chassis spring member.

In the various views the same letter will designate the same parts.

10 represents the chassis frame and at the extreme end a lever which I denominate a "seesaw" bar is pivoted on a pivot 22.

19 is a vehicle axle and surrounding the same is a ring 20. The ring 20 embraces the axle 19 and on either side of the ring are bands 21 to hold the ring from endwise movement of the axle. The bands 21 closely encircle the axle being fastened thereto as by screws 22 and prevent axial movement of the ring 20.

Encircling the ring 20 are upper and lower hangers 18, 18¹. These hangers comprise semi-circular meeting portions encircling the ring 20 and are bolted together by bolts 29 and 30 the ring 20 resting in a groove in the hangers. The lever 12 is pivoted as at 31 to the lower hanger 18 on a bolt 31 passing through two arms 32, 32¹ of the hanger. The upper hanger 18¹ has corresponding bifurcations 33 and 33¹, between which is pivoted a bar 16, the bar being pivoted at its other end at 27 to a downwardly projecting lug attached to one side of the chassis frame 10 in any convenient manner as by bolts.

I provide a leaf spring 15 also resting between the arms 33, 33¹ of the upper hanger and attach the spring to the bar 16 in any convenient manner as by clips 26. The spring end of the leaf spring 15 is attached to lever 12 as by means of shackles 14, the shackles 14 being pivoted to the lever 12 by pivot 24 and to the spring by pivot bolt 25.

The ring 20 may turn on the axle 19, and it will be observed from the above described construction that in passing over an obstruction the axle when pressed toward the chassis frame 10 will allow the hangers to slightly turn on the axle to compensate for any relative movements of the chassis frame 10 and the lever 12. When the axle moves downwardly after passing an obstruction, the hangers, resting on the ring 20, may turn relatively to the axle 19. The spring 15, being rigidly held to the bar 16 by the clip 26, will maintain the parts in spring balanced relation and take up the jolts caused by running over an obstruction.

Having now described my invention what I claim as new is:

1. The combination with a vehicle frame of an axle, a lever pivoted at one end to the frame, a hanger having an upper and a lower portion surrounding the axle, a bar pivoted at one end to the frame and near the other end to the upper portion of the hanger, the lower end of the hanger being pivoted to the said lever, and a spring attached at one end to said lever and at the other end to said bar.

2. In combination with a vehicle frame, an axle, a hanger comprising upper and lower portions attached to the axle, a bar pivoted to the said frame and to the upper portion of the hanger, a lever pivoted to the frame and the lower portion of the hanger, and a spring rigidly attached to said bar at one end, and a shackle between said spring and the said lever.

3. In combination with a vehicle frame, an axle, a ring surrounding said axle, a hanger comprising upper and lower portions and resting on the ring, a bar pivoted at one end to the frame and near the other end to the upper portion of the hanger, a lever pivoted at one end to the frame and near its middle portion to the lower portion of the hanger, and a spring with one end attached to said bar and the other end attached to the end of the lever.

4. In combination with a vehicle frame, an axle, a hanger comprising upper and lower portions surrounding the axle, a bar pivoted to the upper portion of the hanger, a lever pivoted to the chassis frame and the lower portion of the hanger, and a spring interposed between the upper portion of the hanger and attached to the opposite end of said lever.

5. In combination with a vehicle frame, an axle, a lever pivoted to the frame, a bar also pivoted to the frame, means for pivotally attaching said bar and lever to the axle, a spring attached to said bar and pivotally attached to said lever at its end opposite to the end attached to the frame.

6. In combination with a vehicle frame, an axle, a lever pivotally attached to the frame at one end, said lever extending backwardly beyond said axle, and means pivotally attached to said lever near its middle and to said axle, a bar attached to the frame and means for attaching the bar pivotally to the axle, and a spring attached to the bar and to the lever.

In testimony whereof I affix my signature.

CALVIN DOZIER.